(12) United States Patent
Herring et al.

(10) Patent No.: US 11,232,535 B2
(45) Date of Patent: Jan. 25, 2022

(54) SYSTEMS AND METHODS FOR USING EGL WITH AN OPENGL API AND A VULKAN GRAPHICS DRIVER

(71) Applicant: Channel One Holdings Inc., Tampa, FL (US)

(72) Inventors: Daniel Herring, Fort Worth, TX (US); Ken Wenger, Mississauga (CA)

(73) Assignee: Chanel One Holdings Inc., Tampa, FL (US)

( * ) Notice: Subject to any disclaimer, the term of this patent is extended or adjusted under 35 U.S.C. 154(b) by 0 days.

(21) Appl. No.: 17/004,770

(22) Filed: Aug. 27, 2020

(65) Prior Publication Data

US 2021/0049730 A1 Feb. 18, 2021

Related U.S. Application Data

(63) Continuation of application No. 16/057,968, filed on Aug. 8, 2018, now Pat. No. 10,789,669.

(Continued)

(51) Int. Cl.
*G06T 1/20* (2006.01)
*G06F 9/451* (2018.01)
*G06T 15/00* (2011.01)

(52) U.S. Cl.
CPC ............ *G06T 1/20* (2013.01); *G06F 9/451* (2018.02); *G06T 15/005* (2013.01); *G06T 2210/32* (2013.01)

(58) Field of Classification Search
CPC .......... G06T 1/20; G06T 15/005; G06T 17/00

(Continued)

(56) References Cited

U.S. PATENT DOCUMENTS 10,074,206 B1 9/2018 Ingegneri
10,102,605 B1 10/2018 Ingegneri
(Continued)

FOREIGN PATENT DOCUMENTS

EP 1847966 10/2007
EP 3159849 4/2017

OTHER PUBLICATIONS

Del Chiaro, Silvia, Communication pursuant to Article 94(3) EPC (Examination Report) dated Jul. 19, 2021, 6 pages, European Patent Application No. 18188061.8; European Patent Office, Munich, Germany.

(Continued)

*Primary Examiner* — Thomas J Lett
(74) *Attorney, Agent, or Firm* — Woods Oviatt Gilman LLP; Dennis B. Danella, Esq.

(57) ABSTRACT

A method for using an EGL driver to create a renderable surface for an OpenGL API is provided. The EGL driver and the OpenGL API can be used with a Vulkan graphics driver, a memory, at least one processor, and a module stored in the memory including computer instruction code that is executable by the at least on processor. The method includes creating an EGL display structure; initializing the EGL display structure by querying the Vulkan driver for attributes of a physical display; choosing an EGL configuring matching the provided attributes; and creating the EGL surface. A non-transitory computer readable medium having an EGL driver with computer instruction code that is executable by a processor to create a renderable surface for an OpenGL API is also provided.

15 Claims, 8 Drawing Sheets

Related U.S. Application Data (60) Provisional application No. 62/543,046, filed on Aug. 9, 2017.

(58) Field of Classification Search
USPC .......................................................... 345/622
See application file for complete search history.

(56) References Cited

U.S. PATENT DOCUMENTS

| | | | |
|---|---|---|---|
| 2006/0010454 A1 | 1/2006 | Napoli et al. | |
| 2015/0022541 A1 | 1/2015 | Zelsnack | |
| 2016/0189681 A1 | 6/2016 | White et al. | |
| 2016/0328486 A1 | 11/2016 | Liang et al. | |
| 2017/0116702 A1* | 4/2017 | Viggers | G06T 17/00 |
| 2019/0304056 A1 | 10/2019 | Grajewski et al. | |

OTHER PUBLICATIONS

Daniell, Piers, "Vulkan on NVIDIA GPUs", GTC—On Demand, Aug. 13, 2015, 68 pages.

Gitlab, "vkBasicTypes.inl", https://gitlab.com/xchrome_deps/deqp/blob/4ffa33a4e5c875244f721cd5c07be5d6346a482e/external/vulkancts/framework/vulkan/vkBasicTypes.inl, 21 pages.

Khronos, "Cl_khr_gl_sharing", Dec. 22, 2009, https://www.khronos.org/registry/OpenCL/sdk/1.2/docs/man/xhtml/cl_khr_gl_sharing.html, 5 pages.

Khronos, "Redefining the shading languages ecosystem with SPIR-V", Mar. 3, 2015, https://www.g-truc.net/post-0714.html, 7 pages.

Toral, Iago, "A brief introduction to the Linyx graphics stack", Developer Log, Jul. 29, 2014, https://blogs.igalia.com/itoral/2014/07/29/a-brief-introduction-to-the-linux-graphics-stack/, 5 pages.

Pan, Zhigeng, et al., "Real-time Translator from OpenGL to OpenGL ES for Mobile Devices", ICAT, State Key Lab of CAD&CG, Zhejiang University, Hangzhou, China, Centrality Communications Co., LtD, Shanghai, China, 4 pages.

Shreiner, Dave, et al., "An Interactive Introduction to OpenGL Programming", SIGGRAPH International Conference on Computer Graphics and Interactive Techniques 2004, 162 pages.

Robert, "Some thoughts about the Vulkan API (glNext) and the future of OpenGL", RenderingPipeline, Mar. 3, 2015, http://renderingpipeline.com/2015/03/some-thoughts-about-the-vulkan-api-glnext-and-the-future-of-opengl/, 14 pages.

Wikipedia, "Standard Portable Intermediate Representation", Jun. 5, 2018, https://en.wikipedia.org/w/index.php?title=Standard_PortableJntermediate_Representation&oldid=830919313, 3 pages.

Gitlab, "vktDrawIndirectTest.cpp", https://gitlab.com/xchrome_deps/deqp/blob/b4d41f1ef041179f927a6a04a8fd5913cdf590bb/external/vulkancts/modules/vulkan/draw/vktDrawIndirectTest.cpp, 2015, 16 pages.

Holler, Helmut, "European Search Report", dated Feb. 22, 2017 for European Patent Application No. 16195170.2, European Patent Office, Berlin, Germany, 10 pages.

Tswei, Yu-Jang, "Final Office Action", dated Sep. 18, 2018 for U.S. Appl. No. 15/331,078, United States Patent and Trademark Office, Alexandria, Virginia, 25 pages.

TL Brand & Co, "European Search Report", dated Feb. 15, 2019 for European Patent Application No. 18188061.8-1224/3441877, London, United Kingdom, 7 pages.

* cited by examiner

SYSTEMS AND METHODS FOR USING EGL WITH AN OPENGL API AND A VULKAN GRAPHICS DRIVER

CROSS-REFERENCE TO RELATED APPLICATIONS

This application is a continuation of U.S. patent application Ser. No. 16/057,968 filed Aug. 8, 2018, which claims the benefit of U.S. Provisional Patent Application No. 62/543,046, filed Aug. 9, 2017, the contents of which are incorporated herein by reference.

TECHNICAL FIELD

The embodiments disclosed herein relate to generating computer graphics, and more specifically, to systems and methods for using EGL with an OpenGL API and a Vulkan graphics driver.

BACKGROUND

The following paragraphs are not an admission that anything discussed in them is prior art or part of the knowledge of persons skilled in the art.

In the embedded graphics industry, OpenGL is the dominant application programming interface (hereinafter, "API") and has lead the industry in a variety of use cases. These use cases range from managing the graphics in avionics display systems to dashboard gauge clusters in automotive display systems, and 3D image processing in the medical field.

The OpenGL API allows an application to specify a set of states to configure a graphics pipeline, culminating in a series of pixel data to be generated or "drawn" onto a surface buffer during a render operation.

At its most basic, the OpenGL API allows an application to render color data to a render buffer in video memory. OpenGL has does not have the ability to create and/or allocate either on screen or off screen buffers. Accordingly, another API is needed regardless of the on/off screen locations.

In the graphics library ("GL") world, there are a number of APIs that allow an application to associate a native display to a render context and render surface. These APIs tend to be platform specific with Windows® providing WGL, Linux's X Windows systems providing GLX, and the embedded platforms generally using EGL.

These APIs vary syntactically and some are better suited for certain use cases than the others, but in essence they all accomplish the same thing: the ability to create a graphics context and a rendering surface and associate that graphics context with the rendering surface and with a native display and windowing system, where the native display is a handle to the display driver's display connection.

Vulkan has been introduced by the Khronos Consortium as a new modular API that is intended to take advantage of current GPUs. With the advent of Vulkan, a new windowing API has emerged to bridge the gap between render surfaces and the native display: Window System Integration ("WSI").

With this in mind, there is a need to provide an EGL solution that sets up the rendering context for Open GL using a Vulcan driver with WSI.

SUMMARY

According to some embodiments, a method for using an EGL driver to create a renderable surface for an OpenGL API is provided. The EGL driver and the OpenGL API are for use with a Vulkan graphics driver, a memory, at least one processor, and a module stored in the memory including computer instruction code. The computer instruction code is executable by the at least one processor. The method includes creating an EGL display structure; initializing the EGL display structure by querying the Vulkan driver for attributes of a physical display; choosing an EGL configuring matching the provided attributes; and creating the EGL surface.

In another embodiment of the method, the method further includes associating the EGL surface with the EGL display and a native windowing system.

In another embodiment of the method, the method further includes creating a graphics context; associating the graphics context with the EGL display; and associating the graphics context with the EGL surface to make the EGL surface a render target.

In another embodiment of the method, the step of creating the EGL display structure is by making an eglGetDisplay function call which uses the Vulkan graphics driver.

In another embodiment of the method, the step of initializing the EGL display structure is by making an eglInitialize function call which uses the Vulkan graphics driver.

In another embodiment of the method, the step of choosing the EGL configuring matching the provided attributes is by making an eglChooseConfig function call which uses the Vulkan graphics driver.

In another embodiment of the method, the step of creating the EGL surface is by making an eglCreateWindowSurface function call which uses the Vulkan graphics driver.

In another embodiment of the method, the provided attributes include color buffer size, depth buffer size, etc.

According to some embodiments, a non-transitory, computer-readable medium is provided, the medium including an EGL driver having computer instruction code that is executable by at least one processor and structured to cause the at least one processor to be configured to: create an EGL display structure; initialize the EGL display structure by querying the Vulkan driver for attributes of a physical display; choose an EGL configuring matching the provided attributes; and create the EGL surface.

In another embodiment of the non-transitory, computer-readable medium, the processor is further configured to associate the EGL surface with the EGL display and a native windowing system.

In another embodiment of the non-transitory, computer-readable medium, the processor is further configured to create a graphics context; associate the graphics context with the EGL display; and associate the graphics context with the EGL surface to make the EGL surface a render target.

In another embodiment of the non-transitory, computer-readable medium, the step of creating the EGL display structure is by making an eglGetDisplay function call which uses the Vulkan graphics driver.

In another embodiment of the non-transitory, computer-readable medium, the step of initializing the EGL display structure is by making an eglInitialize function call which uses the Vulkan graphics driver.

In another embodiment of the non-transitory, computer-readable medium, the step of choosing the EGL configuring matching the provided attributes is by making an eglChooseConfig function call which uses the Vulkan graphics driver.

In another embodiment of the non-transitory, computer-readable medium, the step of creating the EGL surface is by making an eglCreateWindowSurface function call which uses the Vulkan graphics driver.

In another embodiment of the non-transitory, computer-readable medium, the provided attributes include color buffer size, depth buffer size, etc.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The embodiments of the systems and methods described herein may be implemented in hardware or software, or a combination of both. In some embodiments, the systems and methods are implemented in computer programs executing on programmable computers each comprising at least one processor, a data storage system (including volatile and non-volatile memory and/or other storage elements), at least one input device, and at least one output device. In other embodiments, the systems and methods are implemented in computer programs executing on programmable computers that have limited or no input devices as commonly understood in the computer industry (e.g. no keyboard, no mouse, no scanner, no text telephone ("TTY") device). In these embodiments, the computer systems may automatically start programs without user intervention and start processing data which is received from a network interface. For example and without limitation, the programmable computers may be a programmable electronic controller, mainframe computer, server, personal computer, laptop, personal data assistant, a cellular telephone or an embedded computer system such as an avionics system. Program code is applied to input data to perform the functions described herein and generate output information. The output information is applied to one or more output devices, in known fashion.

Each program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. read only memory (ROM) or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

In the field of computer graphics, a person skilled in the art will understand that particular terms have specific meanings and definitions provided by the OpenGL® standard. Generally speaking, the meanings and definitions of specific terms related to the OpenGL standard can be determined by referring to the standards and documentation published by the Khronos Consortium, such as at the website www.khronos.org. For example, the terms "context", "object", and "state" have specific meanings.

OpenGL can be viewed as a state machine. Thus, at any particular time, an OpenGL instance can be defined by its particular state. In this view, OpenGL functions can be grouped into three broad categories of functions. First are those functions that set state into an OpenGL context. Second are those functions that can query state. Third are those functions that preform rendering operations based on state.

An OpenGL context can be thought of as representing an object that stores the state associated with a particular instance of OpenGL. An OpenGL context can represent a default framebuffer that render commands draw to rather than a framebuffer object.

An OpenGL object is a construct that contains a state. An OpenGL object can be bound to a particular context, in which case, the object state is mapped to the state of the context. Thus, changes in the state of the context will also be applied to the object, and functions that act on the context state will also use the object's state. Objects can be classified as regular or container objects (or non-standard objects). Examples of regular objects are buffer objects, query objects, renderbuffer objects, sampler objects, and texture objects. Examples of container objects are framebuffer objects, program pipeline objects, transform feedback objects, and vertex array objects. Examples of non-standard objects are sync objects and shader or program objects.

A texture object can contain one or more images, where all of the images have the same image format. The image format describes the way that data is stored in order to represent the images in texture objects and renderbuffer objects. In other words, the image format defines the meaning of the data associated with the image.

With the introduction of GL on Vulkan, the present application proposes a solution where a GL application does not need to be aware that it is running on top of a Vulkan driver. However, since the GL application would use EGL, it follows that there must be an implementation of EGL which sets up the rendering context for OpenGL using a Vulkan driver with WSI. Without a corresponding EGL\WGL\XGL driver on Vulkan, an OpenGL driver on Vulkan is not useable as the EGL driver is responsible for creating the Surfaces which the OpenGL driver renders to.

EGL is the preferred solution over XGL or WGL as it is an open standard and a required standard of other open systems standards such as the Future Avionics Capability Environment (FACE®) technical standard. EGL and OpenGL are required by this and other system standards and, because Vulkan is a better API to support GPUs, the creation of a portable EGL library which utilizes Vulkan to be used with an OpenGL on Vulkan library provides a benefit to the avionics and safety critical application space.

By implementing EGL and OpenGL on top of Vulkan it provides not only the now required OpenGL and EGL libraries but also provides the Vulkan API on the platform for when the system standards are updated to reflect changes in graphics technology, such that existing software and hardware can support newer programs for longer periods without needing to be upgraded simply to expose the Vulkan API.

Figure 1:
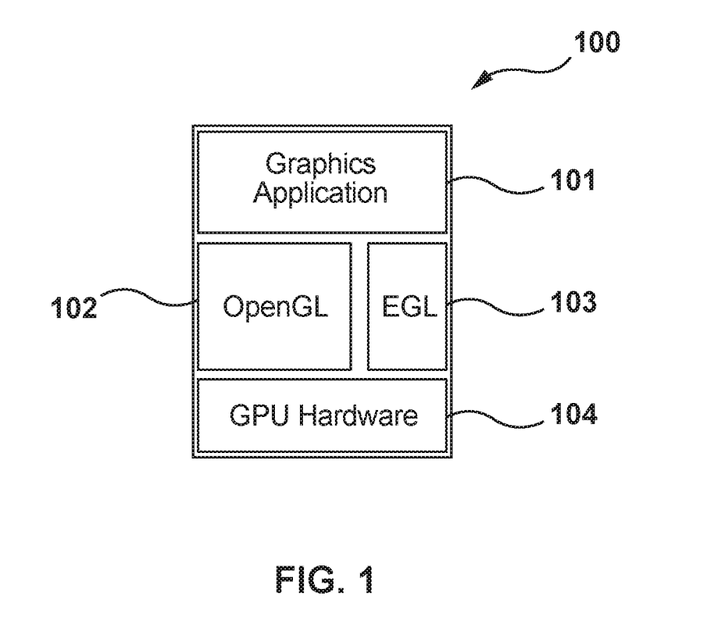
FIG. 1 is a block diagram of an OpenGL stack.

Referring to FIG. 1, there is a block diagram of an existing design of a graphical application stack 100. The stack 100 is responsible for accessing GPU resources. Graphics application 101 overlays OpenGL 102 and EGL 103 which interface directly with Graphics Processing Unit (GPU) 104. In stack 100 of FIG. 1, the OpenGL 102 and EGL 103 libraries are also hardware drivers making their content highly dependent on the hardware interface to the GPU 104. The OpenGL driver 102 is responsible for taking OpenGL API calls from graphics application 101 and providing associated hardware-specific instructions to GPU 104. The OpenGL 102 is designed to operate with a first GPU 104. According to some embodiments, the GPU 104 may be optimized for OpenGL. Thus, the OpenGL driver 102 provides the GPU 104 with instructions based on an application making OpenGL API calls.

Figure 2:
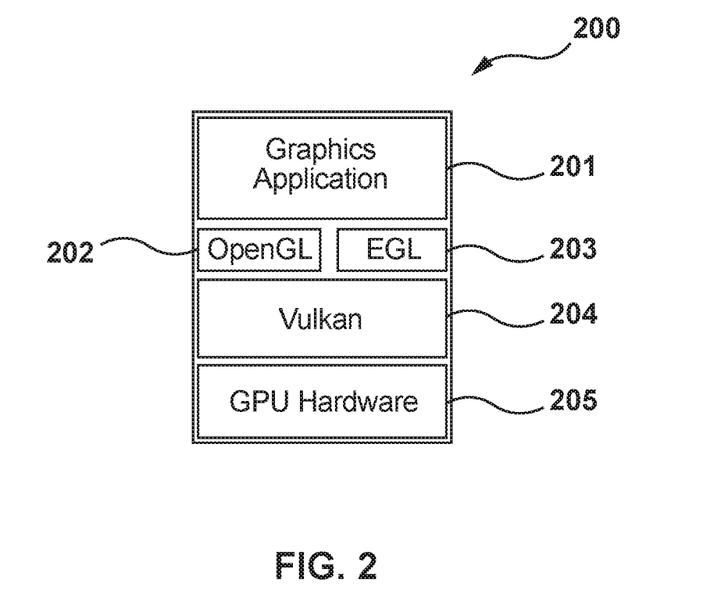
FIG. 2 is a block diagram of a high level architecture of OpenGL and EGL on a Vulcan driver.

FIG. 2 is a block diagram of a stack 200 having OpenGL 202 and EGL 203 using a Vulkan driver 204. Stack 200 also shows relative sizes of the OpenGL 202, EGL 203 and Vulkan driver 204 with respect to OpenGL 102 and EGL 103 of FIG. 1. According to some embodiments, when an application 201 initiates an OpenGL API call, the application 201 is unaware that, at some point, a Vulkan driver 204 will be involved in executing the operation. In this way, the API call travels through the OpenGL driver 202, and is transformed to a Vulkan operation. As the operation enters the Vulkan driver 204, the Vulkan driver 204 is unaware that the operation originated in an OpenGL application (e.g. application 201).

In FIG. 2, the OpenGL 202 and EGL 203 do not communicate directly with GPU 205 and therefore are not platform specific. Rather, OpenGL 202 and EGL 203 are separated from GPU 205 by Vulkan driver 204. By removing direct communication between GPU 205 and the OpenGL 202 and EGL 203, a higher level of reuse can be provided of the OpenGL and EGL drivers. This may be important in safety certifiable software (e.g. software for the aviation industry) as OpenGL 202 and EGL 203 can be reused without changing between platforms. Further, a higher level of reuse can also provide for the OpenGL 202 and EGL 203 to grow their feature sets with a single amount of work regardless of the underlying GPU interface. The ability to add new features in a platform agnostic way can reduce development and deployment times for graphical drivers, such that standards like OpenGL SC can grow to be feature complete with OpenGL over shorter time periods when compared to if the same features had to be implemented in every GPU dependent OpenGL 102 driver.

As driver development is reduced by this implementation, the application development can also be reduced (as described below, where use of the Vulkan API at an application programming level requires that the programmer do significantly more work and understand much more complex processes than when using the OpenGL/EGL APIs).

Figure 3:
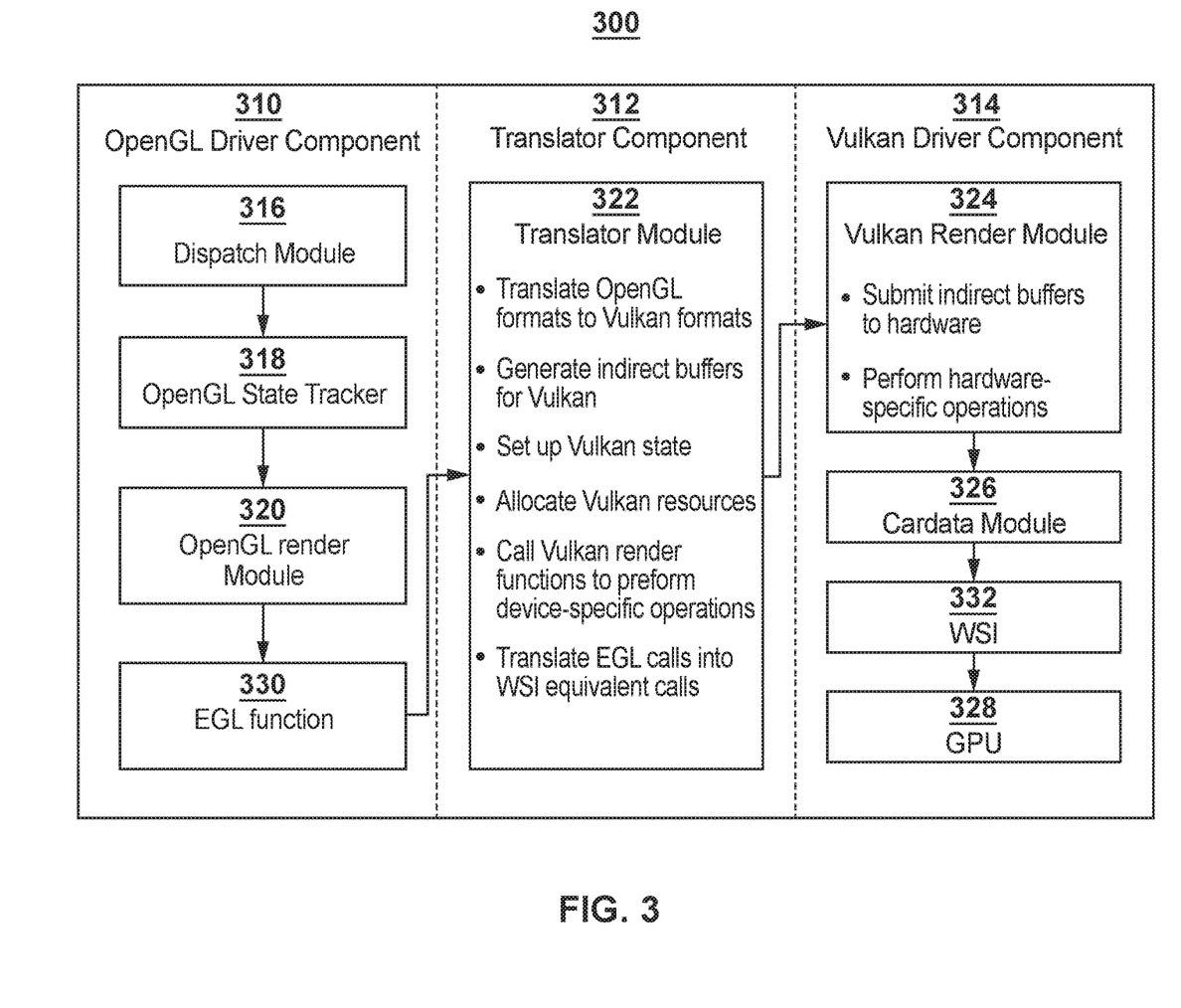
FIG. 3 is a block diagram of an OpenGL-on-Vulkan driver architecture that includes a translator to Window System Integration (WSI) according to one embodiment.

Referring to FIG. 3, there is shown an OpenGL-on-Vulkan driver architecture 300 that includes a translator to Window System Integration (WSI).

Generally speaking, the OpenGL API allows an application to render color data to a render buffer in video memory but cannot create the render surface. A second API is needed to create the render surface (e.g. EGL).

There are a number of APIs that allow an application to associate a native display to a render context and render surface. These APIs tend to be platform specific, with windows providing WGL, X Windows systems providing GLX, and embedded platforms generally using EGL.

With the introduction of Vulkan, a new windowing API has emerged to bridge the gap between render surfaces and the native display. Specifically, Vulkan includes Window System Integration (WSI). WSI aims to be a complete set of platform specific implementations defined as part of the Vulkan standard.

According to some embodiments, the OpenGL-on-Vulkan driver architecture 300 may ensure that an OpenGL application need not be aware that it is running on top of a Vulkan driver. Thus, it follows that an application that uses EGL need not be aware that it is running on top of WSI.

Figure 5:
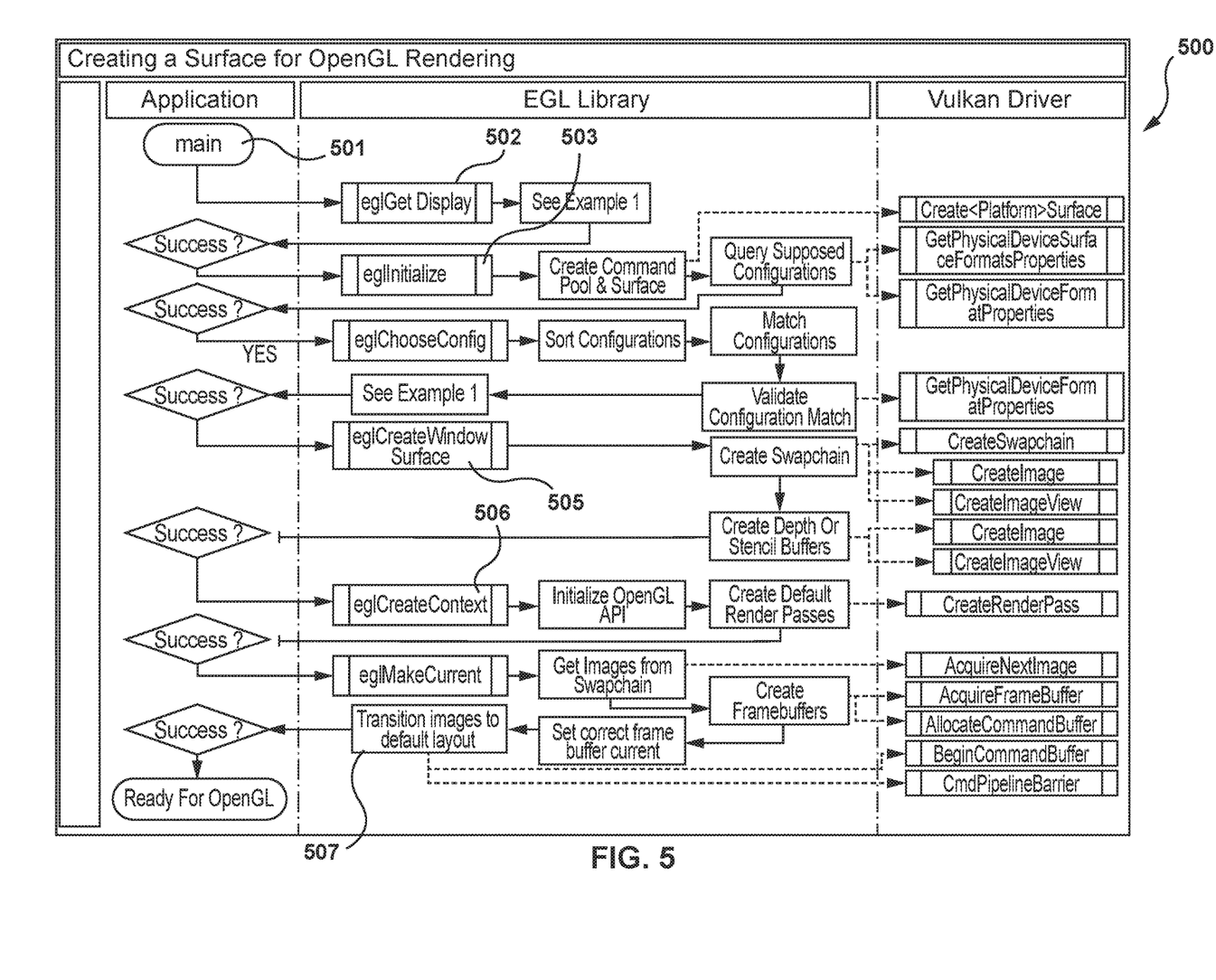
FIG. 5 is a flow diagram depicting a method to create a surface for OpenGL rendering according to one embodiment.

In the example shown in FIG. 3, an OpenGL-on-Vulkan driver architecture 300 uses EGL on WSI. The EGL API provides a list of functions that an application can use to create a graphics context, a render surface, a display, and associate the three as the current render targets. An example of an EGL application making API calls is shown in FIG. 5 (below).

Initializing the Driver

Figure 4:
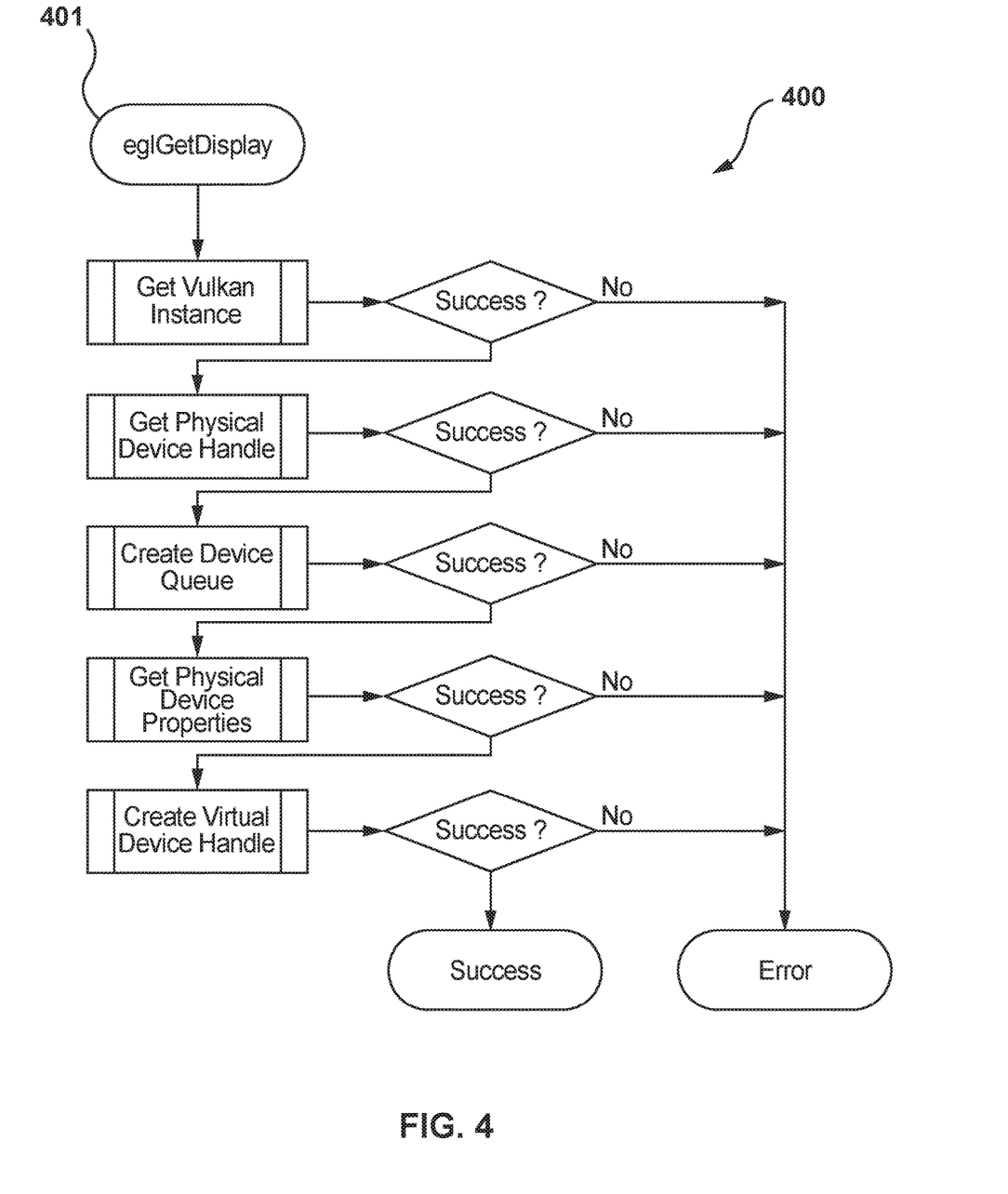
FIG. 4 is a flow diagram depicting a method to get handles to the GPU for the EGL driver according to one embodiment.

Referring to FIG. 4, there is shown an example 400 of a call from an application to an EGL driver. As shown in FIG. 4, EGL possesses a simple single call GPU selection function designed to get handles to the GPU for the EGL driver. This call is eglGetDisplay 401.

To do the same work as eglGetDisplay an application writing to the Vulkan API must make the following calls at least once;

vkCreateInstance( ) vkEnumeratePhysicalDevices( ), vkGetPhysicalDeviceQueueFamilyProperties( ), vkGetPhysicalDeviceProperties( ), vkGetPhysicalDeviceFeatures( ), vkCreateDevice( ), vkGetPhysicalDeviceMemoryProperties( ).

As can be seen by this basic example 400, EGL provides a much simpler API to the programmer than Vulkan does. The EGL on Vulkan library (as shown in FIG. 2) can therefore provide the EGL API to the programmer while using the Vulkan interface to talk to the GPU hardware.

Creating a Renderable Surface

Referring to FIG. 5, there is shown an example 500 of creating a surface for OpenGL rendering. Whereas FIG. 4 shows example 400 of how eglOpenDisplay must call a number of functions to make the one call work, example 500 provides an example EGL start up process and how EGL calls are mapped to Vulkan calls to provide the OpenGL API a valid context and surface to draw on. Example 500 shows some of the high level Vulkan functions which are called from the associated EGL entry points in the EGL Library. It should be noted that, for simplicity, example 500 does not show all the functions used.

As an example, the EGL application 501 may make API calls in the following order. A call eglDisplay 502 can be made to create an EGL display and associate that display with a native display connection using "eglDisplay=eglGetDisplay(handleToNativeDisplay)". On windows, this may be a handle to the device context or hDC. Then, the EGL display structure can be initialized using eglInitialize 503.

An EGL configuration matching the provided attributes (color buffer size, depth buffer size, etc.) can be chosen using eglChooseConfig 504. An EGL surface can be created and associated with the EGL display and native windowing system using eglCreateWindowSurface 505. Then, a graphics context can be created and associated with the EGL display using eglCreateContext 506. Finally, a context can be associated with an EGL display and an EGL surface, and these can be made the current render target using eglMakeCurrent 507.

In order to accomplish the above, and utilize WSI in Vulkan, the translator module 322 of FIG. 3 can translate the EGL into an equivalent WSI call. The translator module 322 receives the EGL function 330, translates it to the equivalent WSI call 332, which is then sent to the GPU 328.

The example 500 provides an embodiment of a unique out of order concept of first creating a Vulkan surface before knowing anything about the surface properties which the application is looking for or if it is even trying to render to a screen. After creating the Vulkan surface, the application queries for the supported properties of the surface and then creates the sized swapchain and its associated images after the application chooses a proper EGL configuration.

Based on example 500, it might be assumed that certain EGL objects could be associated with certain Vulkan objects; such as an EGL Contex could be mapped to an OpenGL Context+Render Pass. Or a EGL Window Surface is a swapchain and depth or stencil buffer. The idea of a true object mapping between the two APIs has been a common pitfall. The case is that to map EGL objects to Vulkan objects must be done in complete sums, where the EGL objects may not be complete until after a following call is made. Because of this non-completeness, the EGL API must check for completeness before accessing certain objects; such as the EGL Surface, or EGL Context object.

Mapping of Configuration Values

Following mapping of high level objects (such as described above), finer details about the system should be mapped. Vulkan does not understand what an EGL Configuration is but, like an EGL Configuration, only permits certain parameter combinations to be valid based on hardware or software features enabled or disabled.

The function eglChooseConfig 504 is used by the application developer to tell the rendering context to have the certain properties such as the number of bits for the red component of the Surfaces to be created. Vulkan likewise has the ability to specify how many bits of red to have in an Image provided it does this by setting the image format and querying if support for that format is available.

For example, if one assumes that an application programmer requests a windowed Surface using eglCreateWindowSurface 505 with 8 bits for the red component, 8 for the green component, 8 for the blue component, 2 for the transparency component, a stencil buffer with 2 bits, a depth buffer with 16 bits, and multi-sample anti-aliasing using 4 samples per pixel. Using EGL, this would use the following symbol array:

```
{
EGL_RED_SIZE, 8,
EGL_GREEN_SIZE, 8,
EGL_BLUE_SIZE, 8,
EGL_ALPHA_SIZE, 2,
EGL_STENCIL_SIZE, 2,
EGL_DEPTH_SIZE, 16,
EGL_SAMPLES, 4
EGL_NONE
}
```

In Vulkan, this sort of configuration requires both a swap chain for rendering the color buffers into an image and requires either one or two other images for use for the depth and stencil buffers. For the color buffers of size R-8, G-8, B-8, A-2, there exist many Vulkan image formats that can satisfy this request which can be interpreted as at least 8 bits for each color and at least 2 bits for the alpha value. This means that when creating a swap chain for the color buffers, the VK_FORMAT_R8B8G8A8_UNFORM could be used since it has 8 bits for each component but at the same time another valid format is VK_FORMAT_B8G8R8A8_USCALED where the color bits are not in the same order. Or VK_FORMAT_A2R10G10B10 could be used which says provide 10 bits for the RGB values and 2 bits for the Alpha value.

At the same time, the depth and stencil buffers also need to have a compatible format found. One option is to create a combined Depth/Stencil Image using a format like VK_FORMAT_D16_UNORM_S8_UNORM. A second option is to use two images with the depth image having a format of VK_FORMAT_D32_SFLOAT or VK_FORMAT_D32_UNORM, while a separate stencil image may use the format VK_FORMAT_S8_UINT or even VK_FORMAT_D16_UNORM_S8_UNORM where this image is not attached to the Depth attachment point of the rendering pipeline.

As can be seen when so many options exist to fulfill the requested parameters from the user, it becomes a very large list of configurations which must be returned to the application when eglGetConfigs is called and these are all based what the Vulkan driver has reported that it can configure.

Figure 6:
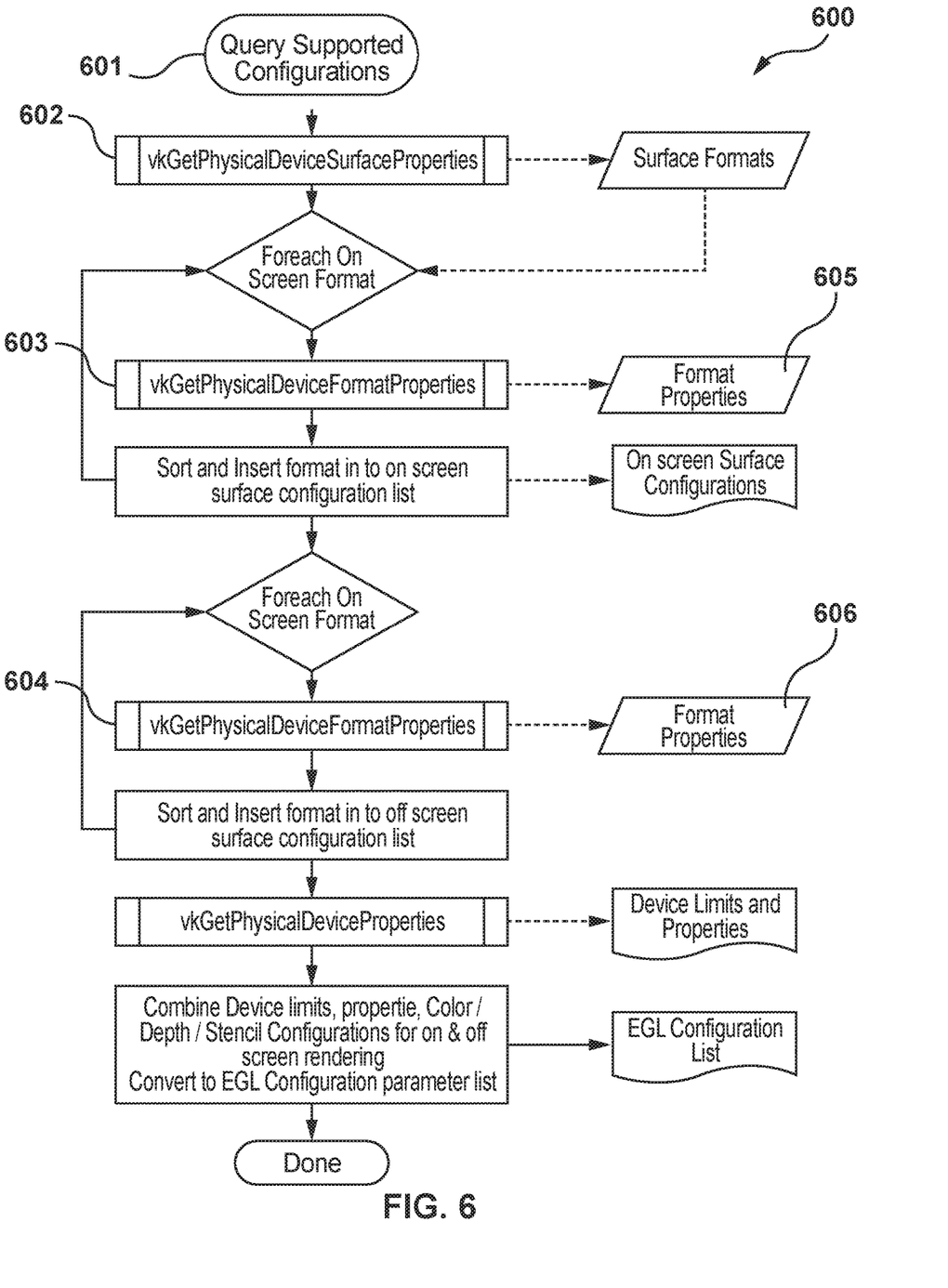
FIG. 6 is a flow diagram depicting a method to create an EGL configuration list according to one embodiment.

FIG. 6 shows a method 600 to create and simplify this list such that the combinations do not overwhelm the application programmer or the time constraints of the driver initialization. Method 600 is needed because a true EGL implementation on top of Vulkan requires that the possible combinations be enumerated and provided to the application programmer based on the parameters of the Vulkan implementation.

Method 600 starts in eglInitialize (e.g. eglInitialize 503) by querying supported configurations 601 (e.g. asking Vulkan for all the supported formats supported by the implementation). At query 602, the physical device surface properties are requested. At queries 603 and 604, the physical device format properties for each on-screen format and off-screen format are requested, respectively. The format properties are then used to determine if the format can be used to render to, or if it can be used as a depth or stencil format.

Once the formats are found to be usable, the size and type of each component is extracted (e.g. at format properties 605 and 606) and bit masking is used to create simple sortable hashes and reduce the format table (i.e. if the table has VK_FORMAT_R8_UNORM, VK_FORMAT_R8G8_UNORM, VK_FORMAT_R8G8B8_UNORM, and VK_FORMAT_R8G8B8A8_UNORM, then create a single configuration using VK_FORMAT_R8G8B8A8_UNORM since it encompasses the others using a simple bitmask).

Since embedded systems have very strict startup and memory usage requirements the data generated by this process is then cached such that any subsequent call will only preform the enumeration if something about the system has changed which might cause a change to the available configurations.

Querying Supported Configurations

The method 600 shown in FIG. 6 is designed to give the maximum available property options to the user of this the library. Further, method 600 is platform independent as all the information the process uses is queried from the platform's Vulkan driver.

When combining the color format VK_FORMAT_R8G8B8_UNORM and VK_FORMAT_D32_UNORM, the formats are first converted in to arrays of 16 bit integers which have indexed space for all the EGL parameters so VK_FORMAT_R8G8B8_UNORM gets changed to {24, 0, 8, 8, 8, 0, 0, . . . 0} and VK_FORMAT_D32_UNORM gets changed to {0, 0, 0, 0, 0, 32, 0 . . . 0}.

By doing component wise addition of these 2 arrays we get an EGL format array {24, 0, 8, 8, 8, 32, 0, 0 . . . 0} when we create a color buffer attachment with the format VK_FORMAT_R8G8B8_UNORM and a depth buffer attachment with the format VK_FORMAT_D32_UNORM.

Once the list of all the formats which are supported is created and the flags set as to whether or not they work for on screen or off screen rendering the function eglChooseConfig has a much easier time determining the best matching and best performing Vulkan formats and properties to use when creating either Window, PBuffer, or Pixmap Surfaces. Because the Vulkan limits and properties are constant across all formats this information needs copied to each of the output arrays after the arrays are combined.

A unique part of this approach is that using Vulkan the library is able to load up the limits and properties as shader program push constants, and the formats as data to be passed to a compute shader running on the GPU to do the task of combining the format arrays, and setting the limit data. At the same time that the format arrays are combined by the GPU and the constants are set the EGL attribute identifiers are also added to the output array such that the final output from running the compute shader pipeline is a complete set of EGL attribute configuration arrays, as required to be returned from eglGetConfigs.

By building an EGL library that utilizes the Vulkan APIs to access the GPU, the EGL library may provide compatibility to existing software while allowing GPU hardware to change without the need to recreate the EGL library. It also allows the EGL library to off load some of the internal library processing from the CPU to the GPU reducing the overall total startup time, and ensuring proper functioning of the GPU during the normal startup routines of EGL.

While it may seem that this library is simply an application of the fundamental theorem of software engineering as applied to graphics and the introduction of the Vulkan API in to the existing ecosystem of OpenGL and EGL programs, the use of this library can provide for the removal of levels of indirection from software. Without this library, any graphical frameworks used in the market where both EGL and Vulkan exist require that the frameworks create an indirection layer within themselves to target different driver APIs. This library can provide any framework to create either an EGL application or a Vulkan application and see that both will run on the same compute platform without layers of indirection in the frameworks.

Figure 7:
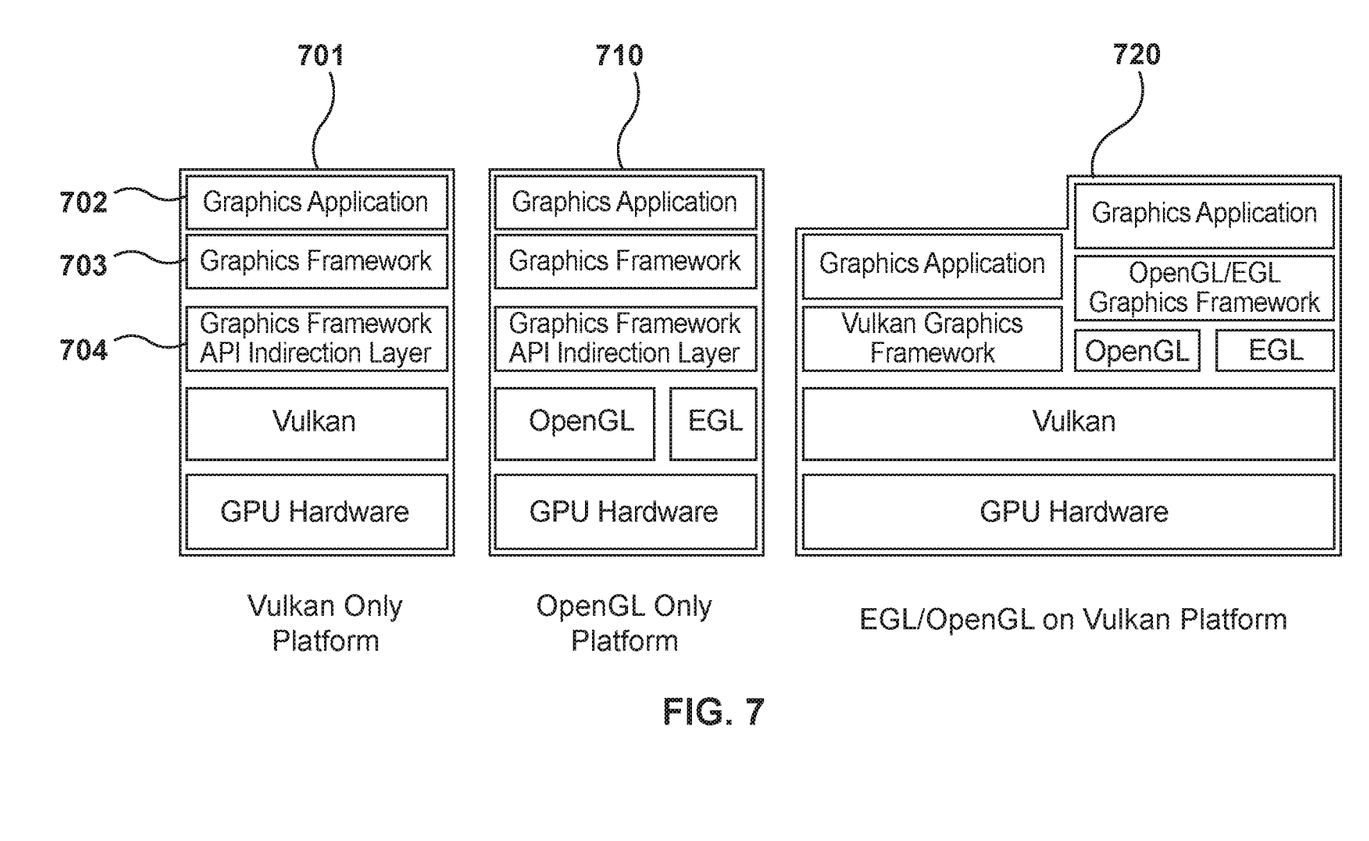
FIG. 7 is a block diagram of graphics framework layers in a Vulkan only platform, an OpenGL only platform and an EGL/OpenGL on Vulkan platform according to one embodiment.

Referring to FIG. 7, a graphics application stack 701 is shown. Stack 701 is similar to stack 100 of FIG. 1, however application 101 of FIG. 1 is broken down in to its constituent parts in FIG. 7. As shown in stack 701, there exists a graphics framework 703 which partially contains a graphics driver API indirection layer 704.

It is indirection layer 704 that the EGL library described herein is intended to replace. Further, the EGL library described herein is intended to make indirection layer 704 completely unneeded as the Graphics framework 703 can be written to take full advantage of the industry standard open graphics APIs provided by OpenGL/EGL or Vulkan. Some estimates and measurement have shown that Graphics Frameworks API Indirection Layers account for as much as 30% of the time spent by the CPU when running graphical application.

Stack 710 of FIG. 7 shows an example of an OpenGL only stack utilizing an EGL library. Stack 720 of FIG. 7 shows an example of an EGL/OpenGL on Vulkan platform utilizing an EGL library.

Figure 8:
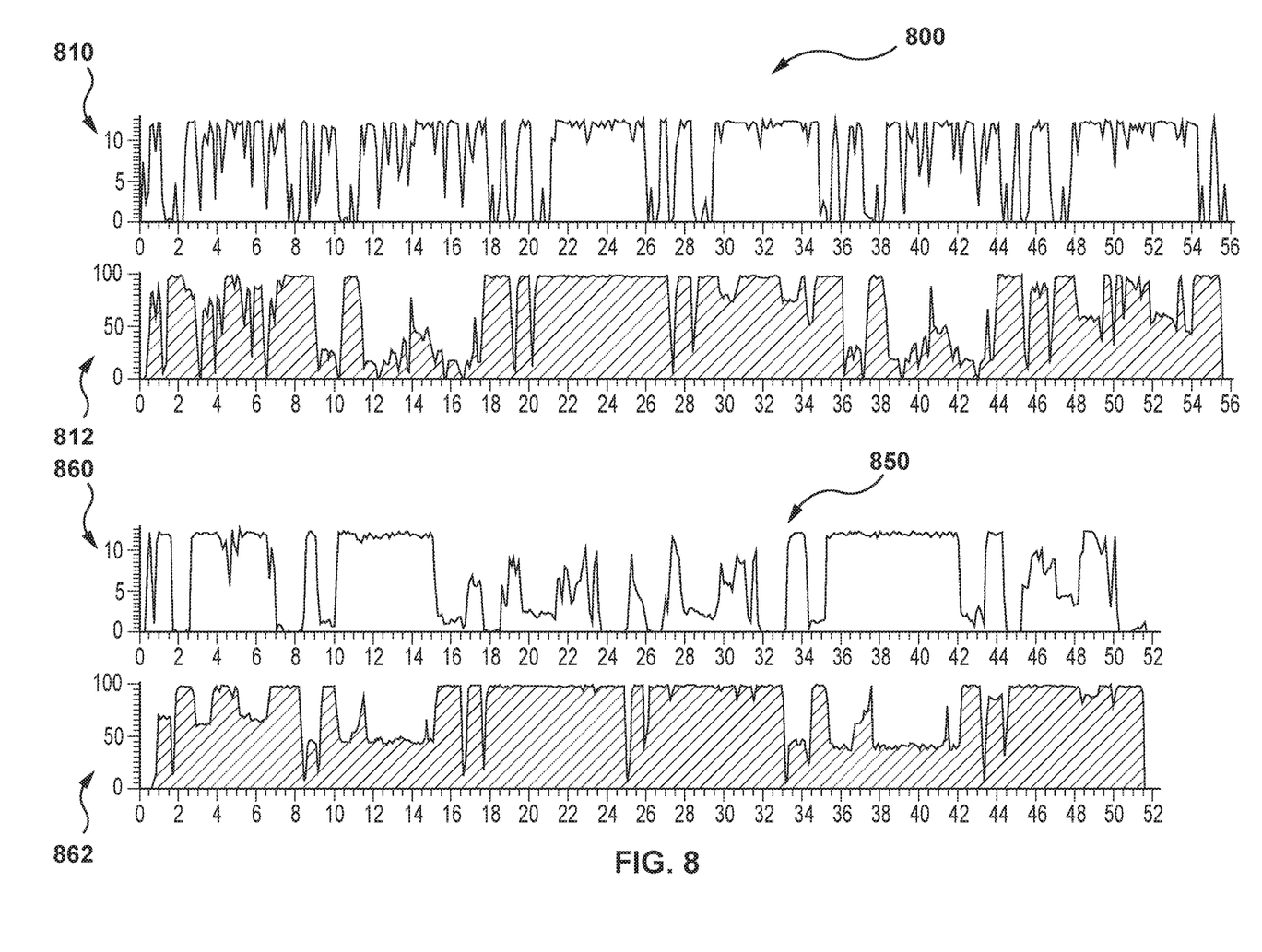
FIG. 8 is a diagram of exemplary performance analysis data according to one embodiment.

Referring now to FIG. 8, illustrated therein are exemplary performance analysis data 800 and 850 according to one embodiment. The performance analysis data 800 are based on a benchmark test using an AMD™ OpenGL ES 2 driver. The performance analysis data 850 are based on a benchmark test using the Vulkan SC 2 layer (e.g., as described herein). The graphs 810 and 860 show CPU utilization (% weight using resource time), and the graphs 812 and 862 show GPU utilization (utilization as resource time).

Figure 9:
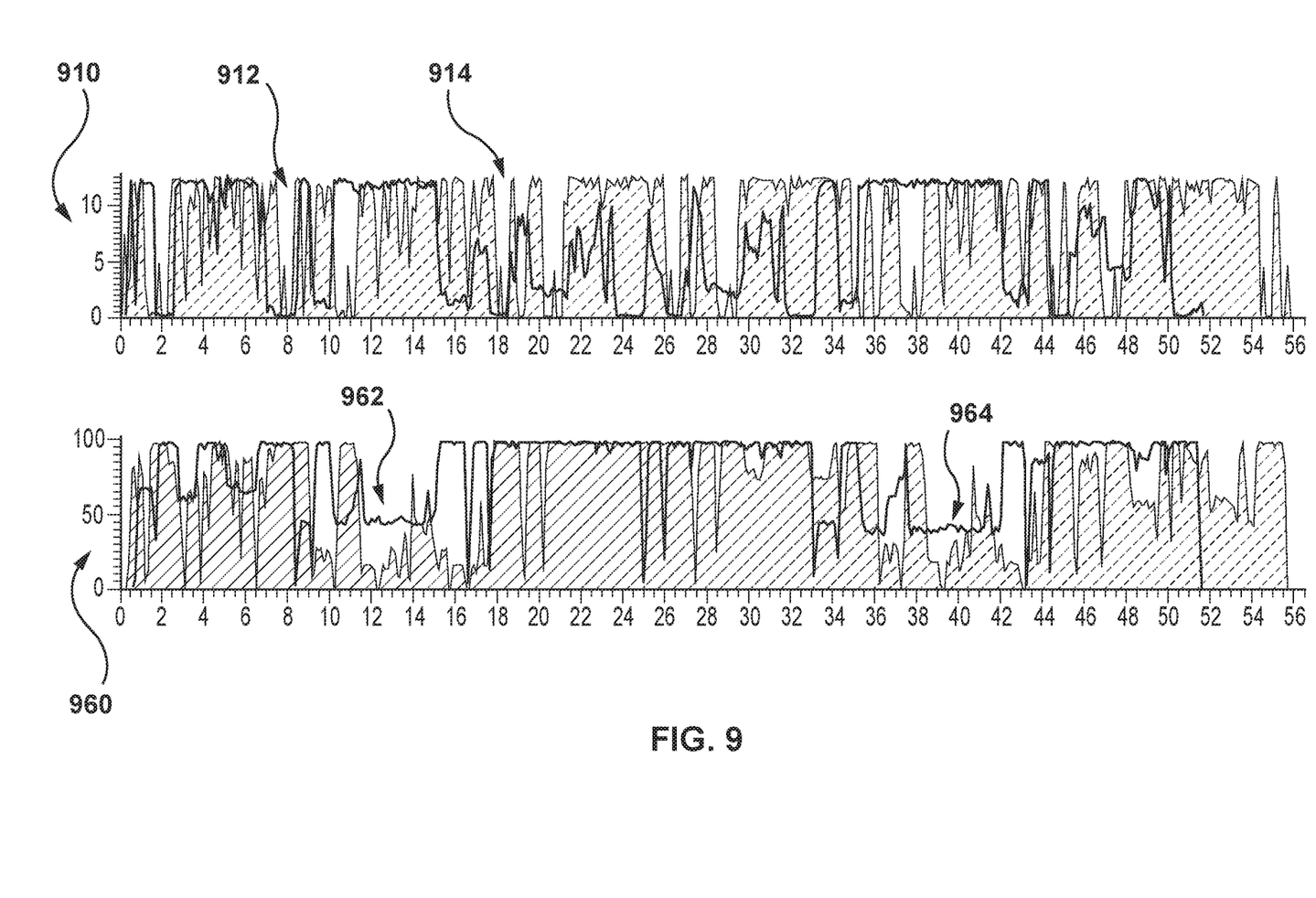
FIG. 9 is another diagram of exemplary performance analysis data according to one embodiment.

Referring now to FIG. 9, illustrated therein are exemplary performance analysis data 900 according to one embodiment. The graph 910 shows CPU utilization, and the graph 960 shows GPU utilization. The curves 912 and 962 represent a rendering test using Vulkan, and the curves 914 and 964 represent a rendering test using OpenGL ES 2.0. As can be seen, the Vulkan test was concluded in a total time of 51.6 seconds, whereas the GL ES 2.0 test was concluded in a total time of 55.6 seconds. The overlay comparisons shown in the graphs 910 and 960 show less CPU usage to achieve full GPU loading, as shown in the middle section of the curves 914. These results also show that the GPU and CPU usage is more even and constant (see curve 962) under most conditions using the Vulkan API instead of the GL API.

In respect of immediate-mode rendering design, benchmark testing verifies that, at the time of glDrawArray or glDrawRangeElement, vertex and index data are copied to Circularly accessed VBO and IBOs. Uniform data are updated in Descriptor Set. Binding of VBO and IBOs is queued before a draw command with binding point starting at the start of data write, and the draw command is queued.

When circular buffers are half full, or some number of draw commands have been put in the queue, the queue is sent to the GPU. In some cases, for example, this may be set to occur with 1,000 draw commands, or when 500 Bytes of vertex data are achieved.

Vulkan uses Pipelines that are combinations of the vertex and fragment shader code, fetch shader definition, and render state setup (primitive type, clipping, viewport, depth bounds, etc.). To allow use of a GL Program concept, there is a composite object that holds the shader code and definition of the VS attributes and uniforms, and a list of pipelines that can represent the program. Each pipeline can maintain a set of data of the properties that make that pipeline unique.

While the above description provides examples of one or more apparatus, methods, or systems, it will be appreciated that other apparatus, methods, or systems may be within the scope of the claims as interpreted by one of skill in the art.

What is claimed is:

1. A method for using an EGL driver to create a renderable surface for an OpenGL API, the EGL driver and the OpenGL API for use with a Vulkan graphics driver, a memory, at least one processor, and a module stored in the memory including computer instruction code that is executable by the at least one processor, the method comprising:
   creating an EGL display structure in response to an eglGetDisplay call from an EGL application;
   initializing the EGL display structure in response to an eglInitialize call from the EGL application, by:
      calling the Vulkan graphics driver to create a Vulkan surface; and
      querying the Vulkan driver for attributes of the Vulkan surface and a physical display associated with the Vulkan surface; in response to an eglChooseConfig call from the EGL application, choosing an EGL configuration matching the attributes; and
      creating the EGL surface in response to an eglCreateWindowSurface call from the EGL application.

2. The method of claim 1, wherein querying the Vulkan driver further comprises requesting physical device surface properties to obtain on-screen and off-screen surface formats.

3. The method of claim 2, further comprising determining whether each of the on-screen and off-screen surface formats can be used for rendering or can be used as a depth or stencil format.

4. The method of claim 3, further comprising, in response to finding that one or more of the on-screen and off-screen surface formats is usable, extracting a size and type of each component, and bit masking to create a format table.

5. The method of claim 4, further comprising caching the format table for use in response to a further call.

6. The method of claim 5, further comprising combining device limits, properties, and color, depth and stencil configurations, and converting to an EGL Configuration parameter list.

7. The method of claim 6, wherein the on-screen and off-screen surface formats, the device limits, properties, and color, depth and stencil configurations are stored as shader program push constants.

8. The method of claim 1, wherein choosing the EGL configuration further comprises validating the EGL configuration matching the attributes.

9. The method of claim 1, further comprising creating a swapchain in response to the eglCreateWindowSurface call, and creating one or more images in the swapchain.

10. The method of claim 9, further comprising creating depth or stencil buffers following creation of the swapchain.

11. The method of claim 10, further comprising:
    associating the EGL surface with the EGL display and a native windowing system.

12. The method of claim 11, further comprising:
    creating a graphics context in response to an eglCreateContext call from the EGL application;
    associating the graphics context with the EGL display; and
    in response to an eglMakeCurrent call from the EGL application, associating the graphics context with the EGL surface to make the EGL surface a render target.

13. The method of claim 12, wherein associating the graphics context with the EGL surface to make the EGL surface the render target further comprises:
    getting one or more images from the swapchain;
    creating one or more framebuffers;
    setting one of the one or more framebuffers current; and
    transitioning the one or more images to a default layout.

14. The method of claim 1, wherein the provided attributes include color buffer size and/or depth buffer size.

15. A non-transitory, computer-readable medium, comprising: an EGL driver having computer instruction code that is executable by at least one processor and structured to cause the at least one processor to be configured to carry out a method for using the EGL driver to create a renderable surface for an OpenGL API, the EGL driver and the OpenGL API for use with a Vulkan graphics driver, the method comprising:
    creating an EGL display structure in response to an eglGetDisplay call from an EGL application;
    initializing the EGL display structure in response to an eglInitialize call from the EGL application, by:
       calling the Vulkan graphics driver to create a Vulkan surface; and
       querying the Vulkan driver for attributes of the Vulkan surface and a physical display associated with the Vulkan surface; in response to an eglChooseConfig call from the EGL application, choosing an EGL configuration matching the attributes; and
       creating the EGL surface in response to an eglCreateWindowSurface call from the EGL application.

* * * * *

UNITED STATES PATENT AND TRADEMARK OFFICE
CERTIFICATE OF CORRECTION

| | | |
|---|---|---|
| PATENT NO. | : 11,232,535 B2 | Page 1 of 1 |
| APPLICATION NO. | : 17/004770 | |
| DATED | : January 25, 2022 | |
| INVENTOR(S) | : Daniel Herring and Ken Wenger | |

It is certified that error appears in the above-identified patent and that said Letters Patent is hereby corrected as shown below:

On the Title Page

Item (72)
Inventor "Ken Wenger, Mississauga (CA)" should read -- Kenneth Wenger, Mississauga (CA) --

Signed and Sealed this
First Day of October, 2024

Katherine Kelly Vidal
*Director of the United States Patent and Trademark Office*